Dec. 13, 1966  F. SINGER  3,291,018
EXPOSURE TIME SETTER
Filed Jan. 14, 1964  3 Sheets-Sheet 1

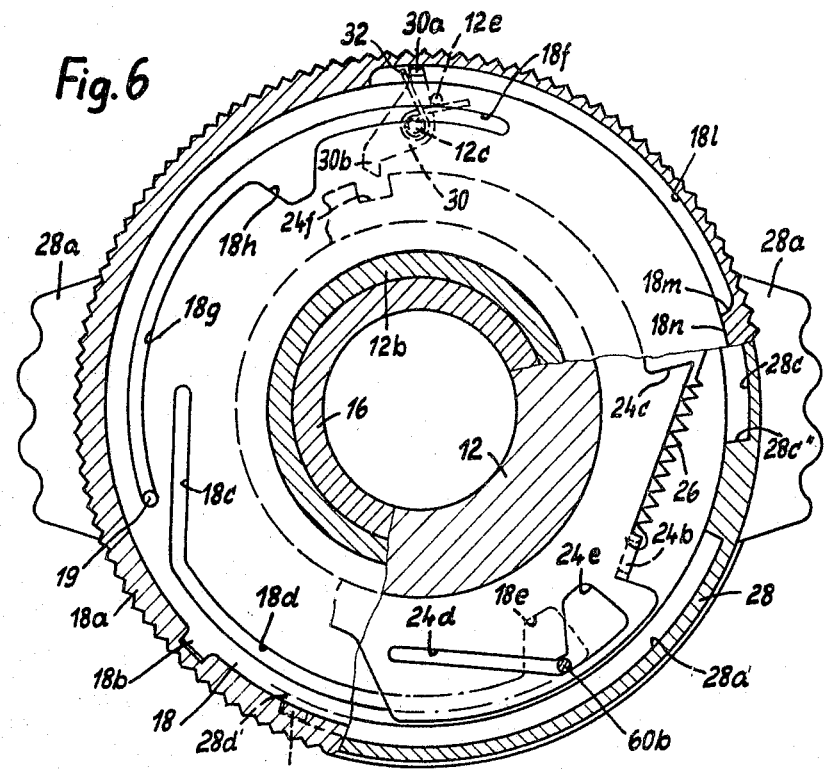
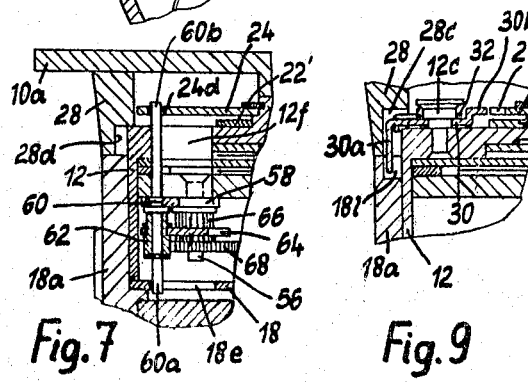
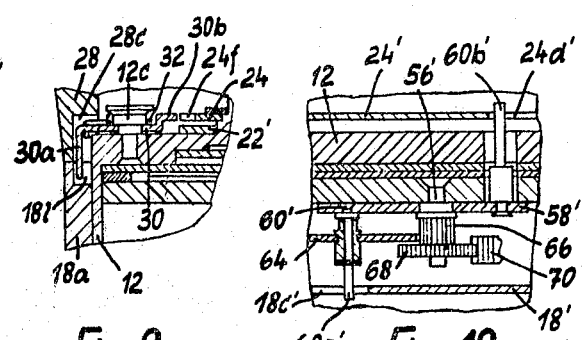

United States Patent Office 3,291,018
Patented Dec. 13, 1966

3,291,018
EXPOSURE TIME SETTER
Franz Singer, Munich, Germany, assignor to Compur-Werk Gesellschaft mit beschrankter Haftung & Company, Munich, Germany, a company of Germany
Filed Jan. 14, 1964, Ser. No. 337,607
Claims priority, application Germany, Jan. 18, 1963,
C 28,945
1 Claim. (Cl. 95—10)

This invention relates to an exposure time setting device for photographic cameras and more specifically to an exposure time setting device which may be automatically or manually actuated and wherein both the automatic and manual means has a control cam associated therewith for setting the mechanism which determine the exposure time value.

Heretofore, exposure time setting devices have been provided with both automatic and manual operating means. The automatic means is normally controlled by a built-in photoelectric exposure meter. However, such prior art devices have been of complicated construction and have consequently been relatively expensive.

According to the present invention there is provided an exposure time setting device which is of simple construction and has a minimum number of parts. In one embodiment of the invention the delay mechanism is provided with a single setting pin, one end of which is actuated by the control cam of the automatic setting means and the other end of which is actuated by the control cam of the manual setting means. A change-over member is provided to disconnect the automatic means when the manual means is actuated.

According to another embodiment of the invention the delay action setting plate has two mutually separate setting pins, the end of each setting pin cooperating with one of the two control cams.

A primary object of the present invention is to provide an exposure time setter for a camera with both manual and automatic control means.

A further object of the present invention is to provide an exposure time setting device which has a minimum number of parts and which is inexpensive to construct.

Other objects and many of the attendant advantages of the present invention will become more readily apparent upon consideration of the following detailed specification in connection with the accompanying drawings wherein:

FIGURES 3 to 7 show the time- and diaphragm-setting parts in transverse and longitudinal sections;

FIGURES 8 and 9 illustrate details of the part seen in FIGURES 7 and 6 respectively, and FIGURE 10 illustrates a further embodiment of the time control arrangement.

Figure 1:
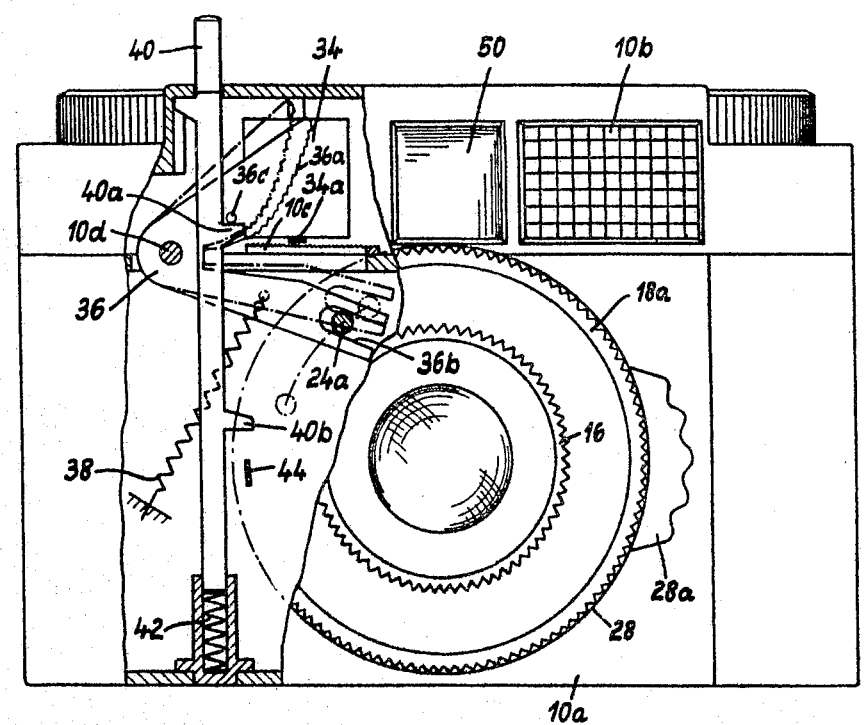
FIGURES 1 and 2 are a front view and a plan of a photographic camera which is equipped with a time- and diaphragm-setting arrangement in accordance with the present invention.
Figure 2:
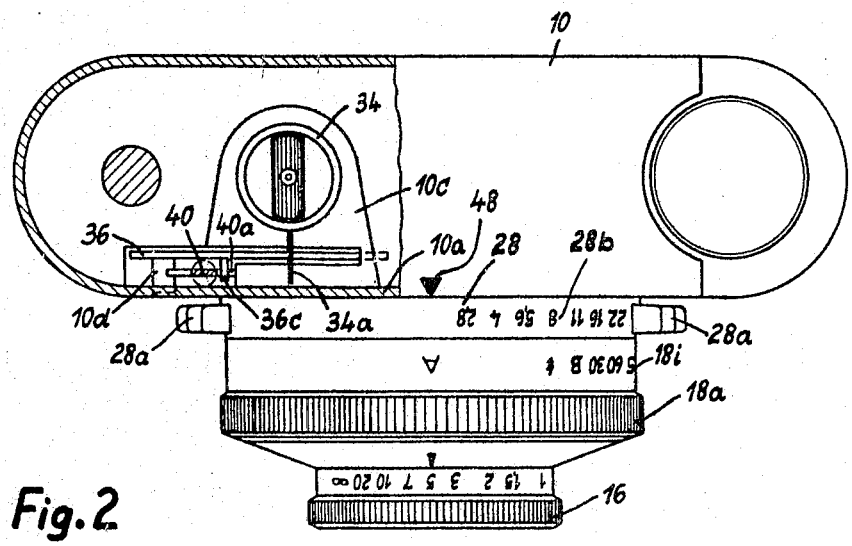
Figure 4:
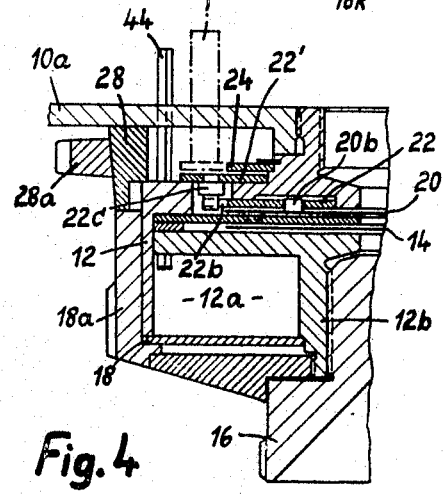

The photographic camera 10 shown in FIGURES 1 and 2 is of generally known construction. As shown in FIGURE 4, the camera carriers at the front wall 10a the housing 12 of a lens shutter, installed in the annular chamber 12a of which is the mechanism, also known, for operating the shutter blades 14. Adjustably mounted in the front tube 12b of the shutter 12 is the holder 16 of a front lens. A control ring 18, shown in FIGURE 6, is used to set the required period of exposure and this is coupled to an exposure setting ring 18a by means of an arm 18b. The control ring 18 has a control slot 18c, 18d for regulating the exposure periods and a recess 18e. This control slot cooperates with a setting pin 60b of a delay mechanism, the function of which is dealt with in more In addition the control ring has a control slot 18f, 18g for regulation of the B-exposures, and a recess 18h. A pin 19 of a B-locking lever, which is of known form and is therefore not here described in more detail, engages in this B-control slot. The ring 18a for setting the exposure period is provided at the periphery with a time scale 18i (FIGURE 2 and a mark "A." In addition it has at the interior an inset portion 18l the end of which is used as a setting ramp 18m, and a driving lug 18k which extends parallel to the optical axis.

Figure 3:
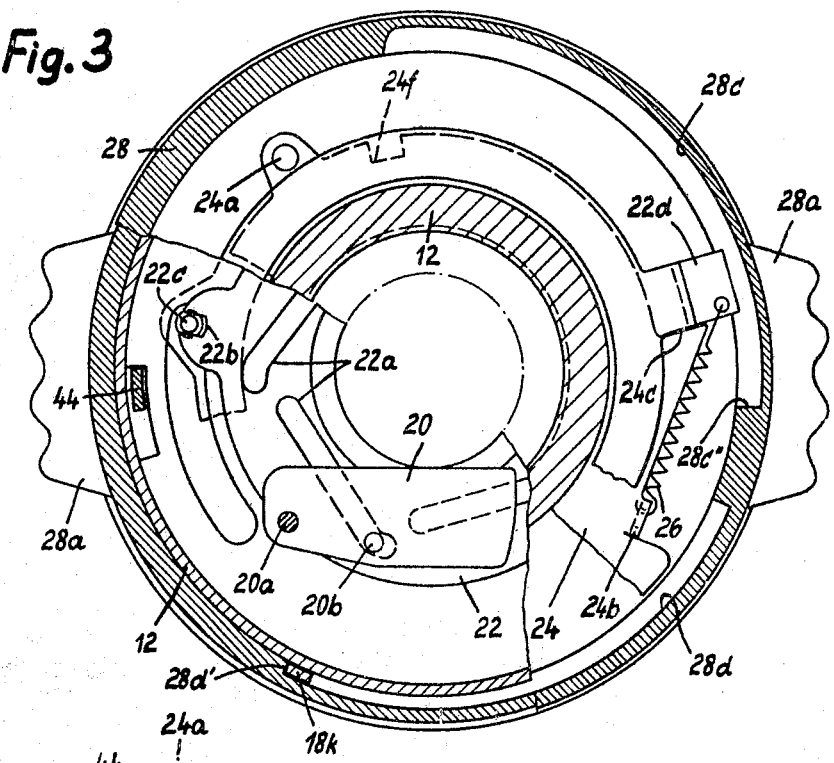
Figure 5:
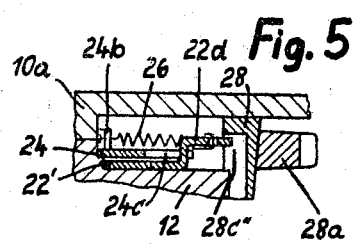

In addition an iris diaphragm is installed in the shutter housing 12, and the blades 20 (FIGURE 3) of this are arranged in an annular space disposed to the rear of the shutter blades 14. Only a single diaphragm blade 20 has been shown in FIGURE 3 for clarity of illustration. The bearing pin 20a of this blade 20 is disposed in the shutter housing 12, and its control pin 20b engages in a control slot 22a in a control ring 22. The control ring 22 is coupled for concordant rotary movement with a further ring 22', shown in FIGURE 4, through the agency of a pin and slot connection 22b, 22c. Thus the two rings 22 and 22' constitute a two-part ring for controlling the diaphragm blades. Rotatably mounted at the rear side of the shutter housing 12, to the rear of the ring 22', is a transmission ring 24 which has an axially projecting pin 24a and a lateral arm 24b (FIGURE 5). A coupling spring 26 interconnects the arm 24b of the transmission ring 24 and the cranked arm 22d of the diaphragm control ring 22', this spring biasing a radial projection 24c of the ring 24 into engagement with the arm 22d of the ring 22' (FIGURE 5). In addition the transmission ring 24 has a control slot 24d, shown in FIGURE 6, with a recess 24e and a cut out 24f.

Further, a manual setting ring 28 is rotatably mounted at the rear wall of the shutter housing 12, this being provided with two finger pieces 28a and a diaphragm scale 28b, both shown in FIGURE 2. Internally it has a recess 28c (FIGURE 3) defining one end of a setting nose 28c", and a second recess 28d, one end of which constitutes an abutment edge 28d'.

A double-armed locking lever 30, shown in FIGURE 9, is arranged in an annular space between the parts 10a, 12 and 28 and this is rotatably mounted on a fixed pin 12c. A spring 32 urges the locking lever 30 in the clockwise direction against a fixed pin 12e. The arm 30a thereof, which is bent off parallel to the optical axis passes forwardly through the recesses 28c and 18l of the setting rings 28 and 18a, and its other arm 30b cooperates with the recess 24f of the transmission ring 24 in a manner which is to be described later.

FIGURES 1 and 2 show that a photoelectric exposure meter 34, of known form, is built into the camera 10, its photocell being arranged behind a window 10b. The movable meter 34, which is electrically connected to the photocell, is equipped with an indicator 34a which moves over a fixed clamping jaw 10c. Associated with the exposure meter indicator is a detector device which includes a detector 36 fixedly mounted at 10d in the camera housing 10 and a rocking spring 38 (FIGURE 1) which engages the same. The detector 36 is in the form of a bellcrank lever, one arm of which constitutes the detector cam 36a, while the other arm has a slot 36b which receives the pin 24a of the transmission ring 24. A tension spring 38 biases the detector 36 in the clockwise direction and urges abutment pin 36c into engagement with a shoulder 40a of a release slide 40. This latter is capable of axial displacement in the camera housing 10 against the action of a return spring 42, but is inhibited against turning. A second shoulder 40b of the release slide 40 cooperates with the shutter trip 44. The spring 38 is somewhat weaker than the return spring 42, so that when the release slide 40 is freed, the parts take up the rest and end-value positions illustrated in FIGURE 1, under the action of return spring 42.

In FIGURES 7 and 8 a pin 56 is shown fastened at the part 12b of the shutter housing and constitutes the bearing pin of a delay mechanism setting plate 58 which carries at its freely-movable end the setting pin 60. Its forwardly-projecting end 60a engages in the control slot 18c, 18d, 18e, of the time control ring 18, while the end 60b which passes rearwards through the slot 12f in the rear wall of the shutter housing 12 engages in the time control slot 24d, 24e of the transmission ring 24. The forward end 60a of the setting pin 60 is surrounded by a bearing bush 62 on which the first member 64 of a delay mechanism is rotatably arranged. The first member has a working pin 64a and at the same time is in the form of a toothed segment, which meshes with the adjacent delay mechanism wheel 66 which in turn drives a fly wheel (not shown) of larger mass through wheels 68 and 70. Interposed between the first member 64 of the delay mechanism and the main driving member (not shown) of the shutter is a double arm transmission lever (likewise not shown) which presses against the pin 64a when the main driving member has run down and turns the member 64.

The construction and operation of the delay mechanism referred to above corresponds to that of U. S. patent application Serial No. 274,563, filed April 22, 1963, now patent No. 3,212,423. The part which has been designated 64 corresponds to the part 30 in this patent application, while the present pin 60 is equivalent to the part 50 in the latter application. Thus the angular disposition of the setting pin 60 relatively to the pin 56 determines the period of delay and the exposure time.

The setting means which have been described above are manipulated as follows:

In the case of an automatic time- and diaphragm-setting, the user must observe that the mark "A" of the exposure time setting ring 18a is disposed opposite an index 48 which is fixed relative to the housing. Possibly the objective lens has to be brought to the given distance by adjustment of the setter holder 16. If the film feed means and, coupled therewith, the shutter cocking have been operated in a well known manner as a preliminary matter, all the preparatory procedures have been performed and the camera is ready to photograph.

When the camera is directed towards the photographic subject the photcell receives the light emanating therefrom, and the exposure meter indicator 34a assumes a position, relative to the detector arrangement, corresponding to the measured brightness of the photographic subject. When the user now presses the release slide 40, the latter is pushed downwards against the action of its return spring 42. The pin 36c abutting the shoulder 40a of the release slide 40, which shoulder also moves downwards, follows under the action of the spring 38 until the detector cam 36a meets the exposure meter indicator 34a and holds this in the metered position. During the pivotal movement of the detector 36, in the clockwise direction from that depicted in FIGURE 1, the transmission ring 24, and the diaphragm control ring 22, 22' which is positively engaged therewith through the coupling spring 26, are carried along in the counterclockwise direction through the agency of the pin-slot connection 24a, 36b, so that the diaphragm blades 20 define a corresponding diaphragm opening.

At the same time the exposure period has automatically been set during the movement of the transmission ring, in that the rear pin end 60b of the delay mechanism setting pin 60 is adjusted by the control slot 24d and the plate 58 consequently caused to pivot about the bearing pin 56. The control ring 18 which is positively moved with the exposure period setting ring 18a into the automatic position, remains unmoved in this position. Its recess 18e is then located above the path of movement of the front pin end 60a of the delay mechanism setting pin 60, so that during the programming regulation (automatic time and diaphragm regulation), the setting pin 60 can move freely (FIGURE 6). The time and diaphragm setting is thus performed, in the case of the programmed control of the camera, by bringing the transmission ring 24 to the detector setting. With the time- and diaphragm-setting completed, during the further downward movement of the release slide 40 the engagement between the parts 36c and 40a is broken and the release slide 40 moves relatively to the now-stationary detector 36 until its second shoulder 40b meets the shutter trip 44 and causes the shutter to be released.

Where required, the exposure meter indicator can be reflected into the viewfinder 50, using means which are already known and which have therefore not been illustrated in the drawings, in order to obtain in the known way a control indication as to whether or not the time and diaphragm automatics are ready.

If, for another photograph, the user wishes to have self-selected specific time-diaphragm combination for particular purposes, for example so as to achieve a special sharpness of definition, he must change over the arrangement from automatic time and diaphragm setting to non-automatic or manuel time and diaphragm setting. This change-over is implemented by means of the exposure time-setting ring 18a which, for this purpose, is turned from the setting position "A" in the counterclockwise direction until the required value on the time scale 28b is in register with the fixed index 48. The following takes place when this manual change-over is performed.

During the initial movement of the exposure time setting ring 18a in the counterclockwise direction, first the driving engagement between the driving lug 18k and the abutment edge 28d' of the diaphragm setting ring 28 is interrupted; this ring is held in its operative position by friction. The control ring 18a is moved through the coupling 18b, and the front end 60a of the setting pin 60 first slides in the radial zone of the slot 18d; subsequently the pin 60 passes into the ascending control slot 18c (manuel time curve from 1/30–1/500 second), as soon as the exposure time value 1/30 second of the time scale 18i is located opposite the fixed mark 48. In addition the pin 19 of the B-locking lever slides in the control slot 18g, drops into the depression 18h when the B-setting is reached and thereafter finally passes into the control slot 18f.

After the setting ring 18a has turned through a predetermined angle, its control ramp 18m contacts the arm 30a of the locking lever 30 and pivots the latter in the counterclockwise direction against the action of spring 32 until its arm 30a is disposed at the inner zone 18n of the setting ring 18a and is able to slide along this. During this pivotal movement, the second arm 30b of the locking lever 30 engages in the cut-out 24f of the transmission ring 24 and moves the latter in the clockwise direction until the recess 24e is brought into the path of travel of the setting pin end 60b. During this angular travel of the transmission ring 24, the coupling spring 26 is loaded and the engagement broken between the projection 24c thereof and the arm 22d of the diaphragm control ring 22, 22' which is still held stationary during this time. During the above mentioned movement of the transmission ring 24 the detector lever 36 has been pivoted by the transmission pin 24a in the counterclockwise direction into the cut-out position and assumes the position which has been indicated in broken lines in FIGURE 1. When the required time value has been set by hand, the diaphragm value is adjusted by hand as the next factor in the operation. This is performed by moving the diaphragm setting ring 28 in the counterclockwise direction so that its setting nose 28c" engages the arm 22d of the diaphragm control ring 22', whereby the latter is carried along in the same direction to the required diaphragm-setting position. During this setting movement, the coupling spring 26 is loaded still further.

If now the release slide 40 is depressed, at the manually-set values for the time and diaphragm, the detector 36 does not participate in this downward movement because both the transmission ring 24 and the detector 36 are held in this case by the locking lever 30.

When the camera is changed back from the hand-setting to automatic time- and diaphragm-setting (programmed control) the exposure time-setting ring 18a is again adjusted to "A." Its driving lug 18k is thereby brought into engagement with the abutment edge 28d', so that the diaphragm setting ring 28 is positively entrained. Further, the inner diaphragm control ring 22' is drawn back into its starting position by the coupling spring 26. In the interim the recess 181 of the exposure time setter 18a has been shifted through the medium of the locking lever 30, the latter having been forced back into its rest position under the action of spring 32. Consequently, the driving engagement between 30b and 24f is broken, so that the transmission ring 24 and the detector lever 36 are moved back under the action of rocking spring 38 into the functional positions thereof illustrated in FIGURES 1 and 3. As a consequence, the positive engagement between the rings 22' and 24 is re-established by the coupling spring 26. The control ring 18 and the pins 19 and 60 or 60a and 60b respectively, which cooperate therewith, reassume their starting position as shown in FIGURE 6.

FIGURE 10 shows a somewhat modified construction of the time-control means, in which the rear end 60b' of the setting pin 60' is not directly extended rearwards, but is introduced into the delay setting plate 58' at another part. The delay setting plate 58' is a double armed plate which is rotatably mounted on the pin 56'. For the rest, the construction of the parts of the delay mechanism are the same as in the preceding embodiment. In this case, and with an "A" setting, when the transmission ring 24' is moved, the pin 60b' slides along the somewhat displaced control cam 24d', the delay setting plate being turned about the pin 56', and the pin 60a caused to perform a free and ineffective movement in a recess in the housing parts. The opposite is the case for hand setting. In this instance, the pin 60a is moved by the time cam 18c' of the control ring 18', the delay mechanism setting plate 58' being turned around the pin 56' so that the pin 60b' is thereby adjusted and can move ineffectively into a recess in the transmission ring 24'.

The construction of the setting arrangement according to this invention, which is operable optionally automatically or manually, has the advantage that the engagement between the setting pin and the control cam of the means determining the exposure period is always made at the same setting part. This engagement can be implemented by a single pin and this furnishes an extremely simple construction. In other cases two separate pins are used, as a consequence of which the setting arrangement according to the present invention can be advantageously suited to the camera shutters and the facility afforded for a transfer between the first and the end stages of the delay mechanism setting part concerned.

For example the members of the setting arrangements can be guided past the blade and diaphragm areas in this advantageous fashion without further transmission elements being required.

A further advantage of the arrangement described is that, in the case of automatic or manuel setting, the two time control cams work in complete independence of one another. This gives a very useful freedom for manoeuvre, for example affording additional possibilities for setting a specific period of exposure ($1/30$ second) for flash photographs with hand operated setting.

The invention has been described in detail with reference to the preferred embodiments thereof. Obviously modifications and variations are possible within the spirit and scope of the present invention. What is claimed as new and desired to be secured by Letters Patent is:

A device for setting the exposure time value for a photographic camera shutter comprising, a photo-electric meter, an automatic exposure time setter operably associated with photo-electric meter, said automatic exposure time setter including a pivotally mounted detector and a transmission pin and a transmission ring coupled to said transmission pin, a manually operable exposure time setter, said manually operable exposure time setter including a manually operable exposure setting ring and a control ring having a plurality of control slots for regulating the exposure time, said control ring being coupled to said exposure setting ring, a delay mechanism for determining the exposure time for the camera shutter, said delay mechanism having a setting pin having two ends and cooperating at a first end with the transmission ring of said automatic exposure time setter and cooperating at a second end with the control ring of said manually operable exposure time setter, and a change over member for disconnecting one end of said setting pin from the ring associated therewith when the other end is actuated to position said delay mechanism, said change over member including a pivotally mounted double arm locking lever for engaging said transmission ring when said exposure setting ring is rotated.

References Cited by the Examiner
UNITED STATES PATENTS 3,190,203 6/1965 Kiper et al. _____ 95—10 X
3,199,425 8/1965 Starp _____ 95—64 X NORTON ANSHER, *Primary Examiner.*

J. F. PETERS, JR., *Assistant Examiner.*